Jan. 13, 1959  R. C. RUSSELL  2,868,001
BIDIRECTIONAL SLIP COUPLING
Filed Feb. 21, 1956

INVENTOR.
ROBERT C. RUSSELL
BY McDonald & Teagno
ATTORNEYS

United States Patent Office 2,868,001
Patented Jan. 13, 1959

2,868,001

BIDIRECTIONAL SLIP COUPLING

Robert C. Russell, Shaker Heights, Ohio, assignor to Eaton Manufacturing Company, Cleveland, Ohio, a corporation of Ohio Application February 21, 1956, Serial No. 567,019

8 Claims. (Cl. 64—30)

The present invention relates to a friction coupling which will transmit a greater amount of torque in one direction of rotation than in the other rotative direction, before slipping.

An object of this invention is to provide a slip coupling in which the same friction element is utilized to transmit torque in both directions of rotation.

Yet another object is to provide a device in which friction bands may be changed to give different torque release values.

These and other objects and advantages will become more apparent from the following detailed description of the device and from the accompanying drawings.

In the drawing, Figure 1 is an exploded perspective view of the coupling parts.

Figure 4:
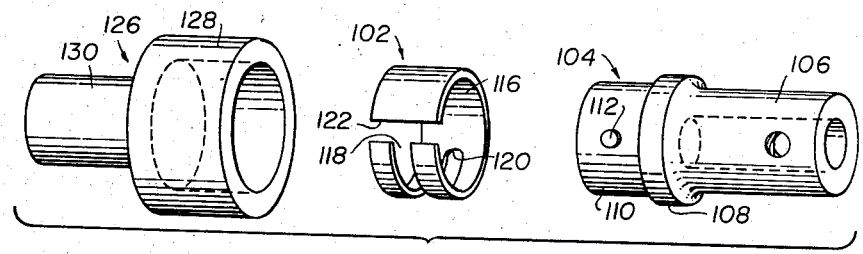
Figure 4 is an exploded view of a modification of the coupling.

The coupling 2 is comprised of a driving element 4 having a shaft portion 6 which is adapted to be rotated in either direction of rotation by a suitable driving means. The shaft portion 6 has integrally attached thereto a flanged portion 8. Integral with flange 8 is a driving coupling portion 10. Formed on a portion 10 of the driving element 4 are radially projecting driving pins 12 and 14. Band 16 is adapted to fit loosely over driving coupling portion 10 and is preferably of about the same width or slightly less than the axial length of portion 10. The band 16 is provided with slots 18 and 20 having end portions 22 and 24, respectively; pins 12 and 14 are receivable in slots 18 and 20, respectively. The length of each of the pins 12 and 14 is less than the thickness of the band 16 so that the ends of the pins 12 and 14 are located radially inward of the peripheral surface of the band 16.

A driven element 26 is composed of a driven coupling portion 28 formed as a sleeve member. Shaft portion 30 is formed integrally with portion 28 and is adapted to be attached to a member to be driven. In assembly, band 16 is fitted over driving coupling portion 10 with pins 12 and 14 fitted in slots 18 and 20, respectively. This subassembly is then fitted inside the driven coupling portion 28 so that band 16 and portion 10 are approximately axially coextensive with driven portion 28. The band 16 is arranged to be in frictional engagement with the internal surface of driven portion 28 with the band 16 exerting a predetermined force on the internal surface of portion 28.

The pins 12 and 14 are circumferentially phased with respect to slots 18 and 20 in such a manner that when the driving element 4 is rotated in one direction of rotation, pin 12 contacts end portion 22 of slot 18 and pin 14 is spaced from the ends of slot 20. When driving element 4 is rotated in the opposite direction of rotation, pin 14 contacts end portion 24 of slot 20 and pin 12 is spaced from the ends of slot 18.

The operation of the device is described in the following manner. A source of power, not shown, is applied to rotate shaft portion 6 in a counterclockwise direction of rotation, as viewed in Figure 3 of the drawing. When shaft 6 is so rotated, pin 14 moves into abutting relation with the end portion 24 of slot 20 and rotates band 16 conjointly with the driving element 4. When band 16 is rotated, this movement is transmitted to the driven element 26 due to the frictional engagement between band 16 and the internal surface of driven portion 28. When the shaft 6 and band 16 are rotated counterclockwise, as described, the band trails the force application point and is, in effect, pulled by pin 14. It is obvious, therefore, that the amount of torque transmitted by the coupling in this direction of rotation is governed by the force with which band 16 is urged against the internal surface of driven portion 28 as well as the coefficient of friction between the members.

Figures 2, 3:
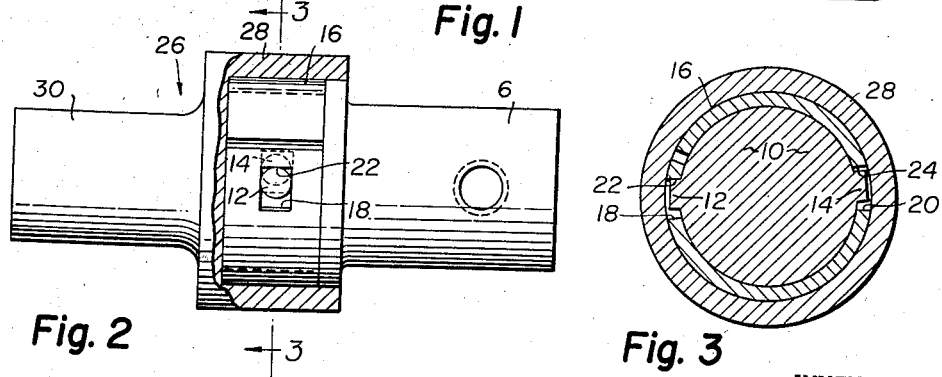
Figure 2 is a side view of the coupling in assembly.
Figure 3 is a section taken at 3—3 on Figure 2.

When shaft 6 is rotated clockwise, as viewed in Figure 3, pin 12 abuts end portion 22 of slot 18 and pulls that portion of the band 16 which trails the slot 18. The portion of the band which leads slot 18 is pushed ahead of pin 12 and since the force application point is behind that portion of the band which leads slot 18, the leading portion of the band is urged into firmer engagement with portion 28. It is obvious, therefore, that the coupling will transmit a greater amount of torque in the clockwise direction than in the opposite direction. If the slot 18 is relocated in band 16 so that a greater arcuate length of the band is pushed by pin 12 and a smaller portion of band 16 trails pin 12, then the coupling will transmit more torque in the counterclockwise direction of rotation.

Figure 1:
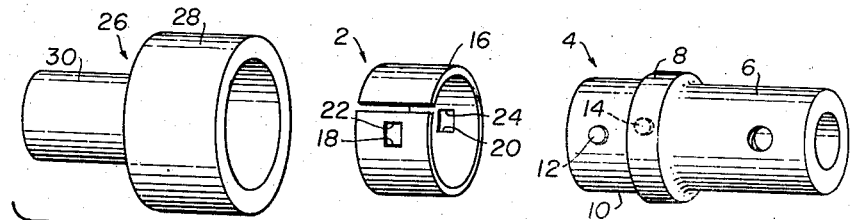

In the coupling disclosed in Figures 1 to 3, the band 16 is assembled in the member 28 with the band 16 exerting a predetermined force on the internal surface of member 28. Because of the relationship of the pins 12 and 14 to the band 16, the band 16 is never urged into greater frictional engagement with member 28 except for that portion of the band which leads the slot 18 when the coupling is rotated in a clockwise direction, as viewed in Figure 6.

Figures 5, 6:
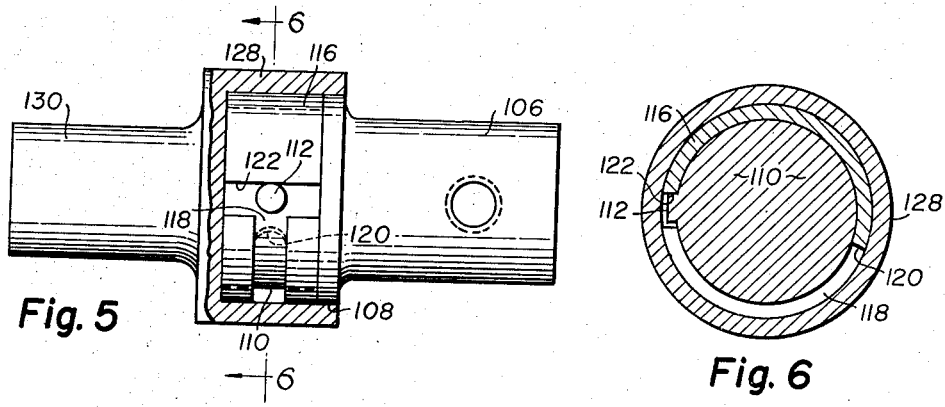
Figure 5 is a side view of the coupling shown in Figure 4.
Figure 6 is a section taken at 6—6 on Figure 5.

Figures 4 to 6 illustrate a modification of the structure heretofore disclosed.

A coupling 102 is comprised of a driving coupling element 104 having a shaft portion 106, a flanged portion 108, and a driving coupling portion 110. Formed on portion 110 is a driving pin 112.

Band 116 is provided with an elongated slot 118 which is of a width slightly greater than the diameter of pin 112. The slot 118 has an end portion 120 adapted to abut pin 112 during certain phases of the operation which will be hereafter discussed. The surface 122 is also adapted to abut pin 112 during other phases of the operation.

The driven coupling element 126 is composed of a driven coupling portion 128 formed as a sleeve member and a driven shaft portion 130 formed integrally with portion 128.

When these parts are assembled, sleeve 116 is fitted loosely over coupling portion 110 and pin 112 is receivable in slot 118. Band 116 and portion 110 are receivable within the sleeve portion 128 of driven coupling element 126. Band 116 is in light frictional engagement with the internal surface of sleeve portion 128. The thickness of band 116 is greater than the length of pin 112 so that there is radial clearance between the pin 112 and the internal surface of sleeve portion 128.

This modification of the coupling operates in the following manner.

The shaft 106 is rotated in a counterclockwise direction, as viewed in Figure 6. The pin 112 moves arcuately until it abuts the end portion 120 of slot 118, resulting in rotation of the band 116. Since a major portion of the band 116 is being pushed by pin 112, the band is urged into greater frictional engagement with the internal surface of sleeve portion 128 and consequently drives the element 126.

When the shaft 106 is rotated in a clockwise direction, the pin 112 abuts surface 122 of band 116 and pushes the entire arcuate length of band 116, tending to expand the band into greater frictional engagement with sleeve portion 128.

It is apparent that when shaft 106 is rotated clockwise and pin 112 abuts surface 122, the coupling will transmit a greater amount of torque than when shaft 106 is rotated counterclockwise. In the counterclockwise direction of rotation, the pin 122 pushes only a portion of the total arcuate length of band 116; the remainder of the band trails the pin 112.

In the modification disclosed in Figures 4 to 6, the band 116 is in light frictional engagement with the internal surface of sleeve portion 128. If the band is rotated clockwise, the torque transmitting capacity is amplified because the band is urged into firmer engagement with the internal surface of the sleeve 128. The torque transmitting capacity of the coupling in the clockwise direction is determined by the area of the band 116 and the coefficient of friction between sleeve 128 and band 116.

If the band is rotated counterclockwise, the torque transmitting capacity is determined by the area of the band which leads the force application point 120. The portion of the band which trails the force application point 120 can be practically disregarded because that portion of the band is in very light frictional engagement with sleeve 128.

If it is desired to transmit twice as much torque in one direction of rotation as in the other direction before the couplings slips, then the slot 118 would be extended approximately one-half the arcuate length of the band.

It is obvious from the foregoing disclosure that the described structure provides a bidirectional slip coupling which will transmit a predetermined amount of torque in one direction of rotation and a different predetermined amount of torque in the opposite direction of rotation. When these torque values are exceeded, the coupling merely slips.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited therefore, only by the broad scope of the appended claims.

What I claim is:

1. A coupling device comprising a rotatable input member, a rotatable output member, an arcuate, resilient band interposed in frictional driving relation between said input and output members, means on one of said members to drive an arcuate portion of said band in one direction of rotation and to drive a greater arcuate portion of said band in the opposite direction of rotation.

2. A coupling device comprising a rotatable driving member, a rotatable driven member, a split arcuate, resilient band in frictional contact with one of said members, slot means provided in said band and means on said other of said members receivable in said slot means to drive an arcuate portion of said band in one direction of rotation and to drive a greater arcuate portion of said band in the opposite direction of rotation.

3. A coupling device comprising a rotatable first member having a plurality of spaced pins drivingly connected to said first member, an arcuate, resilient split sleeve means having slots therein which receive said spaced pins, and a second member having an internal surface portion in frictional contact with said sleeve.

4. A coupling device comprising a driving member, a driven member, intermediate means having a first abutment in positive driving engagement with one of said members in one direction of rotation and a spaced second abutment in positive driving engagement with said one member in the other direction of rotation and said intermediate means being in frictional engagement with the other of said members so that the coupling is capable of transmitting more torque in one direction of rotation than in the other direction of rotation.

5. A coupling device comprising a rotatable driving member, a rotatable driven member, an intermediate, resilient, arcuate band means having a first abutment in positive driving engagement with one of said members in one direction of rotation and a spaced second abutment in positive driving engagement with said one member in the other direction of rotation and said intermediate means being in frictional engagement with the other of said members so that an arcuate portion of said band means is utilized to transmit torque to said one member in one direction of rotation and a greater arcuate portion of said band means is utilized to transmit torque to said other of said members in the opposite direction of rotation.

6. A coupling comprising a first member and a second member, an element drivingly connected to said first member, an arcuate, resilient, intermediate split band member having end portions, said band having a slotted portion extending circumferentially from one of said end portions through an arcuate portion of said band, said slotted portion having an abuttable end portion, said element abutting said end portion of said slotted portion when said first member is rotated in one direction of rotation and abutting said other end portion of said band when rotated in the other direction of rotation, and said band being in frictional contact with said second member.

7. A coupling comprising a driving member, a driven member, a pair of elements connected to one of said members, an arcuate, resilient, intermediate split band having a pair of peripherally spaced slots, one of said elements being engageable with a wall formed by one of said slots in one direction of rotation of said one member and the other of said elements being engageable with a wall formed by the other of said slots in the opposite direction of rotation of said one member, and said band being in frictional contact with the other of said members.

8. A coupling means comprising first and second relatively rotatable members, friction band means, means on one of said members drivingly connected with a portion of said band means in one direction of rotation of said one member, means on said one member drivingly connected with another portion of said band means in the other direction of rotation of said one member, and said friction band means being in frictional drive contact with the other of said members.

References Cited in the file of this patent

UNITED STATES PATENTS

| | | |
|---|---|---|
| 294,672 | Proctor et al. | Mar. 4, 1884 |
| 950,290 | Hughes | Feb. 22, 1910 |
| 1,138,926 | Bernett | May 11, 1915 |